Jan. 16, 1940. V. F. SIMONICK 2,187,465
GEAR SHIFTING MECHANISM FOR MOTOR VEHICLES
Filed Sept. 9, 1936 3 Sheets-Sheet 1

Inventor
V. F. SIMONICK

Jan. 16, 1940.   V. F. SIMONICK   2,187,465
GEAR SHIFTING MECHANISM FOR MOTOR VEHICLES
Filed Sept. 9, 1936   3 Sheets-Sheet 3

Inventor
V. F. SIMONICK
By
Attorney

Patented Jan. 16, 1940

2,187,465

UNITED STATES PATENT OFFICE 2,187,465

GEAR SHIFTING MECHANISM FOR MOTOR VEHICLES

Virgil F. Simonick, Detroit, Mich., assignor to Automatic Shifters, Inc., Richmond, Va., a corporation of Virginia Application September 9, 1936, Serial No. 100,020

13 Claims. (Cl. 74—334)

This invention relates to gear shifting mechanisms for motor vehicles and more particularly to a shifting mechanism for so-called "five-speed transmissions."

Trucks and buses, and some passenger cars, are provided with transmissions having four forward speeds together with reverse, and it is the common practice to effect the shift in any selected gear by the operation of a manual gear shift lever. A number of devices have been proposed for power shifting the transmissions of motor vehicles, but most of these devices are intended for use in shifting a conventional transmission which includes only three forward speeds. This is due to the complications ordinarily introduced into a power shifting mechanism in order to provide for a shift into a fifth position, as is involved in five-speed transmissions.

An important object of the present invention is to provide a power shifting mechanism wherein the shift into a fifth gear position is accomplished through the use of a simple and efficient mechanism.

A further object is to provide a novel "crossover" mechanism for transferring the shifting operation between more than two transmission shift rods.

A further object is to provide a unitary crossover motor for a transmission shifting mechanism, and which is operative for permitting the selection of more than two transmission shift rods, thus adapting the mechanism for use in connection with five-speed transmissions.

Other objects and advantages of the invention will become apparent during the course of the following description.

In the drawings I have shown one embodiment of the invention. In this showing—

Figure 1 is a fragmentary perspective view of a portion of a motor vehicle gear set, showing the shifting mechanism associated therewith, parts being shown in section.

Figures 1, 11:
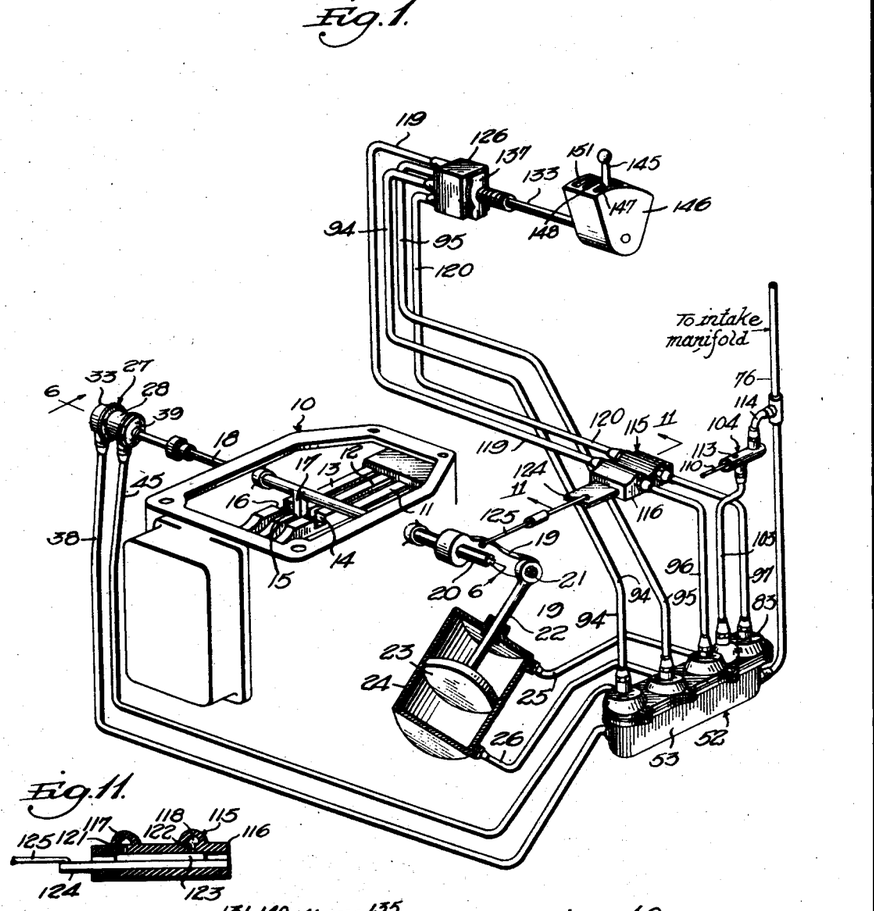
Figure 2:
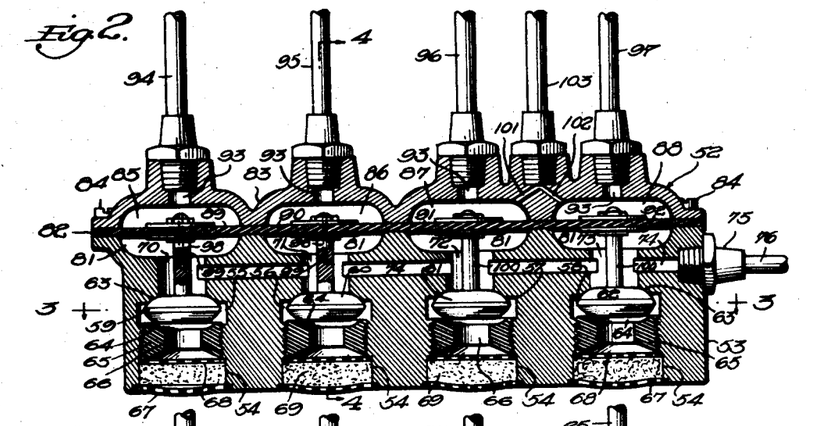
Figure 2 is a central vertical longitudinal sectional view through the main valve mechanism.

Referring to Figures 1 and 2, the numeral 10 designates a transmission as a whole of the five-speed type. That is, the transmission provides for reversing the movement of the vehicle and for driving it forwardly in either of four gear ratios.

The shifting into any one of the selected gear positions is accomplished by transmitting longitudinal movement to either of a plurality of shift rods 11, 12 or 13, these shift rods controlling the changes in the gear ratio in the usual manner. Transmissions of this type are not standardized with respect to the movement of the different shift rods, and for the purpose of the present invention it may be considered that the shift rod 11 moves forwardly for second speed and rearwardly for third speed; that the shift rod 12 moves forwardly for reverse and rearwardly for first speed, and that the shift rod 13 moves rearwardly for the fourth forward speed.

The shift rods 11, 12 and 13 are respectively provided with notches 14, 15 and 16, selectively engageable by a depending arm 17 carried by a rock shaft 18. The shaft 18, as will become apparent, partakes of axial sliding movement to place the arm 17 selectively in the notches 14, 15 or 16, and the shaft 18 is adapted to be rocked in one direction or the other to transmit forward or rearward movement to the shift rod which has been selected for operation. A crank arm 19 has one end splined as at 20 on the shaft 18, while the other end of the arm 19 is connected as at 21 to one end of a piston rod 22. This piston rod is connected to a piston 23 reciprocable in a cylinder 24, and these elements constitute a shifting motor for effecting the longitudinal shifting of one of the rods 11, 12 or 13. Fluid pressure is employed as the source of power for operating the shift motor, and pressures in the ends of the cylinder 24 are controlled through pipes 25 and 26, connected to the respective ends of the cylinder 24. These pipes may possess a substantial degree of flexibility to permit the swinging movement of the cylinder 24 incident to the operation of the arm 19, and any suitable means may be employed for supporting the cylinder 24 to permit it to partake of the movement referred to.

Figures 6, 7, 8, 9:
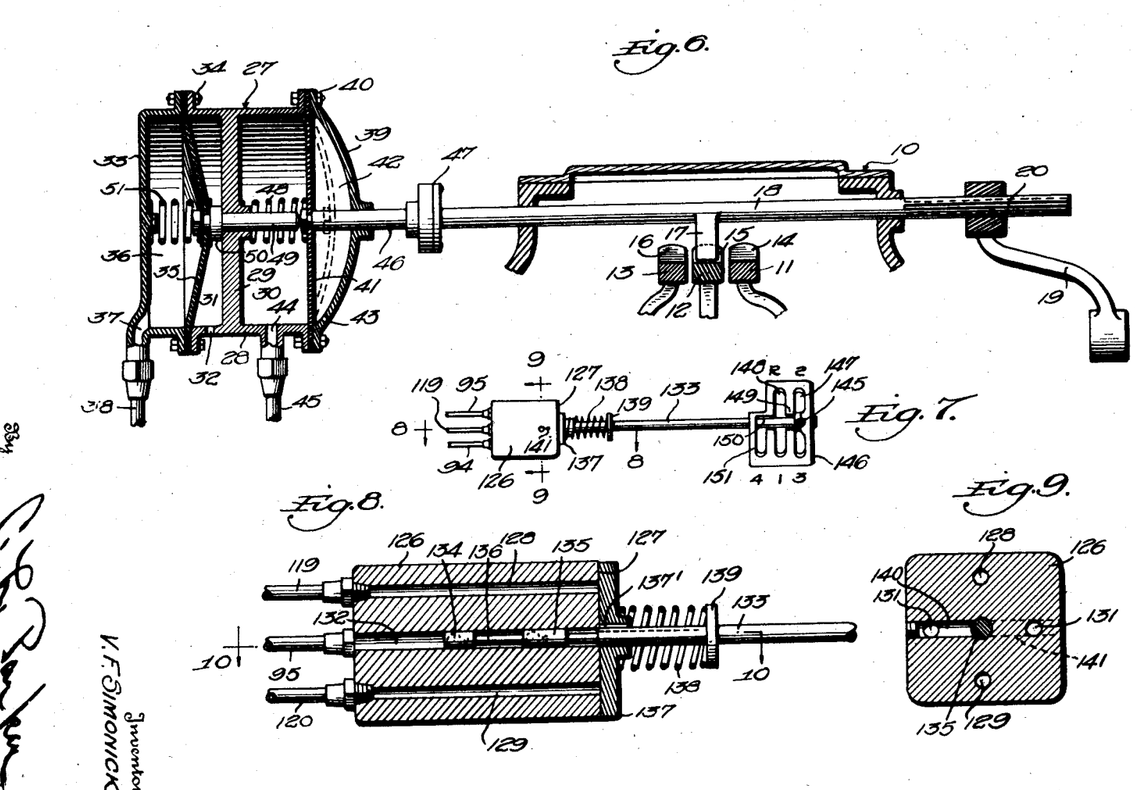
Figure 6 is a transverse sectional view on line 6—6 of Figure 1.
Figure 7 is a plan view of a selector valve mechanism.
Figure 8 is a sectional view on line 8—8 of Figure 7.
Figure 9 is a transverse sectional view on line 9—9 of Figure 7.

A novel crossover motor is employed for selecting either of the shift rods 11, 12 or 13 for operation, the crossover motor being shown in Figure 6 and indicated as a whole by the numeral 27. The crossover motor comprises a central casing section 28 divided by a partition 29 to form chambers 30 and 31, the latter of which is vented to the atmosphere as at 32. A second casing section 33 is arranged adjacent and in axial alinement with the section 28. These two casing sections are flanged at their adjacent ends to receive bolts 34 by means of which the two casing sections may be clamped toward each other with a flexible diaphragm 35 interposed therebetween. The casing section 33 forms a chamber 36 having a port 37 communicating with a pipe 38 for a purpose to be described.

A third casing section 39 is arranged adjacent and in axial alinement with the casing section 28. These two casing sections likewise are flanged to receive bolts 40 to permit them to be clamped together with a diaphragm 41 interposed therebetween. The casing section 39 forms a chamber 42 vented to the atmosphere as at 43. The chamber 30 is provided with a port 44 communicating with a pipe 45. It will become apparent that the pipes 38 and 45 control communication between the respective chambers 36 and 30 with a source of partial vacuum, the chambers 31 and 42 being always in communication with the atmosphere.

A shaft or stem 46 is slidable axially in the casing section 39 and is secured at its inner end to the diaphragm 41. The outer end of the stem 46 is connected to the shaft 18 by a swival connection 47, such connection operating to transmit axial movement from the stem 46 to the shaft 18, while permitting the latter to rock incident to the turning movement of the crank arm 19. A compression spring 48 is arranged in the chamber 30 and engages at opposite ends with the partition 29 and diaphragm 41. This spring tends to urge the stem 46 and shaft 18 toward the right as viewed in Figure 6 to engage the shift arm 17 in the notch 14.

A stem 49 is slidable in the wall 29 and the end of this stem within the chamber 31 is secured to the diaphragm 35. The other end of the stem 49 is engageable against the inner end of the stem 46. The stem 49 carries a flange 50 engageable against the wall 29 to limit the movement of the stem 49 toward the right to the position shown in Figure 6. In such position of the parts, the inner end of the stem 46 will contact with the adjacent end of the stem 49, with the shift arm 17 in engagement with the notch 15. A compression spring 51 is arranged in the chamber 36 and urges the diaphragm 35 to its limit of movement referred to, with the flange 50 engaging the wall 29.

A main valve mechanism indicated as a whole by the numeral 52 is adapted to control the connection of the intake manifold with the respective ends of the cylinder 24, and with the crossover motor chambers 30 and 36. Except for an additional valve, the main valve mechanism may be identical with the valve mechanism shown in the copending application of Edward D. Lasley, Serial No. 97,451, filed August 22, 1936, and is similar in its principles of operation to the valve mechanism disclosed in the prior patent to Edward G. Hill and Henry W. Hey No. 2,030,838, granted February 11, 1936.

Figure 3:
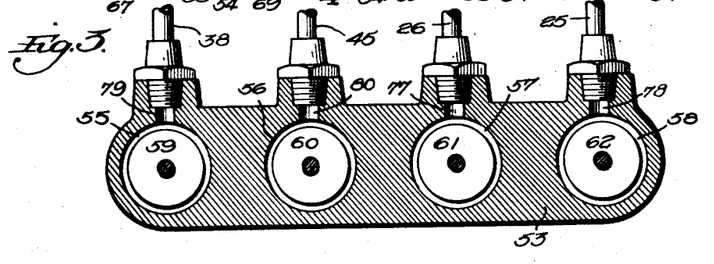
Figure 3 is a horizontal sectional view on line 3—3 of Figure 2.
Figures 4, 5:
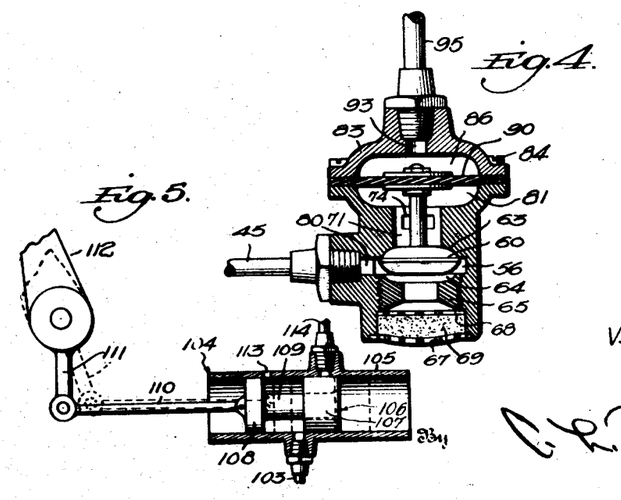
Figure 4 is a transverse vertical sectional view on line 4—4 of Figure 2.
Figure 5 is a detail sectional view through a clutch operated valve showing its connection with the clutch pedal.

Referring to Figures 2, 3 and 4, the main valve mechanism 52 comprises a valve body 53 having four openings 54 extending upwardly through the bottom thereof, and these openings terminate at their upper ends in valve chambers indicated respectively by the numerals 55, 56, 57 and 58, and valves 59, 60, 61 and 62 are arranged in the respective valve chambers. Each of these valves is normally engageable with an upper seat 63 and is movable downwardly into engagement with a lower seat 64 formed in the upper end of a plug 65 threaded in the associated opening 54 and provided with an opening 66 therethrough. Each opening 54 is provided in its lower end with a perforated cap 67 and a perforated plate 68 is arranged in each opening 54, above the cap 67. Packing material 69 is arranged in the space between each plate 68 and its associated cap 67 to prevent the entrance of foreign material into the valve chambers.

The valve body is further provided with a plurality of relatively large vertically extending openings 70, 71, 72 and 73 arranged in axial alinement and communicating at their lower ends with the respective valve chambers 55, 56, 57 and 58, communication between the valve chambers and their associated openings being controlled by the valves, as will be apparent. A passage 74 extends longitudinally through the valve casing and intersects each of the openings 70, 71, 72 and 73, as shown in Figure 2. A union 75 is tapped into the end of the valve casing to communicate with the passage 74, and is connected to a pipe 76 leading to the intake manifold of the motor vehicle engine to provide a source of partial vacuum.

From the foregoing it will be apparent that the respective valve chambers are connected to the atmosphere or to the intake manifold, depending upon the positions of the associated valves, and the valve chambers are connected to the shift motor and crossover motor to effect the operation of these motors. Referring to Figure 3, it will be noted that the valve chambers 57 and 58 are provided with ports 77 and 78 communicating with the respective pipes 26 and 25, previously described. Similarly, the valve chambers 55 and 56 are provided with ports 79 and 80 communicating with the respective pipes 38 and 45.

The upper face of the valve body 53 is provided with a plurality of vacuum chambers 81 communicating with the respective openings 70, 71, 72 and 73, as shown in Figure 2. An elastic sheet 82 is arranged over the upper face of the valve body and closes each of the chambers 81. A valve cap 83 is secured in position against the upper face of the elastic sheet 82 by screws 84 threaded in the top of the valve body. The cap 83 is provided with a plurality of variable pressure chambers 85, 86, 87 and 88, corresponding in position to the several chambers 81, and serving therewith to divide the elastic sheet 82 into a plurality of individual diaphragms 89, 90, 91 and 92.

The valve cap 83 is provided with a plurality of ports 93 by means of which communication is afforded between the chambers 85, 86, 87 and 88 and a plurality of pressure control pipes 94, 95, 96 and 97, respectively. The pressures in the upper diaphragm chambers are controlled in a manner to be described, and the chambers 85 and 86 have fixed limited communication with the source of partial vacuum. It will be noted that each of the valves 59 and 60 is connected to its associated diaphragm by means of a valve stem 98, and each of these valve stems is provided with a restricted passage 99 affording limited fixed communication between the diaphragm chambers 85 and 86 and the source of vacuum, through the passage 74 of the valve body. When the chambers 85 and 86 are disconnected from the atmosphere in a manner to be described, the leakage through the passages 99 balances the pressure on opposite sides of the diaphragms 89 and 90, under which conditions the valves 59 and 60 will remain in engagement with their upper valve seats. When the chambers 85 and 86 are opened to the atmosphere, as will be described, the valves referred to will move into engagement with their lower valve seats 64.

The valves 61 and 62 are similarly controlled except that limited communication is afforded between the diaphragm chambers 87 and 88 and the intake manifold only when the clutch of the vehicle is disengaged, these chambers communicating with the atmosphere when the clutch is in engagement. It will be noted that each of the valves 61 and 62 is connected to its associated diaphragm by a stem 100 which is not provided with a leakage passage as is true in the case of the valve stems 98. However, the valve cap 83 is provided with a pair of restricted passages 101 and 102 connected to each other at their upper ends and communicating at their lower ends with the respective chambers 87 and 88. The upper ends of the passages 101 and 102 communicate with a pipe 103 leading to a clutch valve mechanism indicated as a whole by the numeral 104 and illustrated in Figure 5 of the drawings.

The clutch valve mechanism comprises a tubular valve body 105 in which is arranged a valve 106 having heads 107 and 108 connected by a shank 109. The valve is connected by a link 110 to the lower end of a depending arm 111 carried by the clutch pedal 112. When the clutch is in engagement, the parts occupy the solid line positions shown in Figure 5, under which conditions the space between the valve heads 107 and 108 communicates with the atmosphere through a port 113. The pipe 103 is connected to the valve casing 105 and also communicates with the space between the valve heads 107 and 108 when the clutch is in engagement. Under such conditions the pipe 103, and consequently the diaphragm chambers 87 and 88, communicate with the atmosphere through port 113.

A pipe 114 is connected at one end to the vacuum pipe 76 (Figure 1) and has its opposite end connected to the valve casing 105 and closed by the valve head 107 when the clutch is in engagement. It will be apparent that when the clutch is disengaged, the port 113 is closed to communication with the pipe 103 by the head 108, while the head 107 uncovers the pipe 114 to communication with the pipe 103. Under such conditions, the diaphragm chambers 87 and 88 will have limited communication with the source of vacuum to balance the pressures on opposite sides of the diaphragms 91 and 92, unless the pipes 96 and 97 are opened to the atmosphere in a manner to be described.

The pipes 96 and 97 lead to an auxiliary valve device indicated as a whole by the numeral 115 and illustrated in Figure 11. This valve device comprises a valve body 116 having a pair of passages 117 and 118 therethrough, and these passages communicate with the respective pipes 96 and 97. Pipes 119 and 120 lead from the respective passages 117 and 118 to a selector valve mechanism to be referred to later.

The passages 117 and 118 are provided with ports 121 and 122 respectively, which are adapted to be controlled by a slide valve 123 carried by a plate 124. This plate is connected by a link 125 to any suitable portion of the mechanism which operates in conjunction with the actuation of the shift rods, the link 125 being illustrated in Figure 10 as being connected to the crank arm 19. When the gear set is in neutral position, that is, when the piston 23 is at the center of its stroke, the valve 123 closes both of the ports 121 and 122, and these ports are selectively opened at the end of the stroke of the piston 23, depending upon the direction of movement of the piston, as will become apparent.

Figure 10:
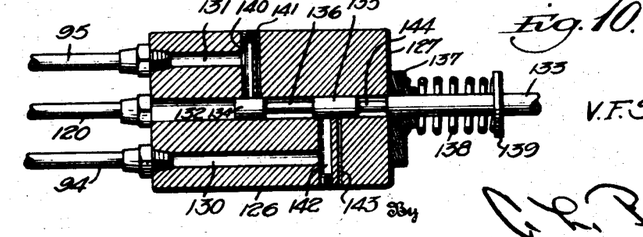
Figure 10 is a section taken on line 10—10 of Figure 8, and, Figure 11 is a detail sectional view on line 11—11 of Figure 1.

The selector valve mechanism for the apparatus is shown in Figures 7 to 10 inclusive. Such mechanism comprises a valve body 126 having a valve face 127 formed at one end thereof, and a pair of respectively upper and lower openings 128 and 129 extend through this valve face. As shown in Figure 8, the passages 128 and 129 communicate respectively with the pipes 119 and 120. The valve body 126 is further provided with a pair of openings 130 and 131, lying in a horizontal plane and communicating with the respective pipes 94 and 95, as shown in Figure 10.

The valve body is provided with a central passage 132 for receiving the inner end of a shaft 133, this shaft being provided with a pair of spaced heads 134 and 135 connected by a reduced shank 136. A valve 137 seats against the valve face 127 and is shaped substantially as shown in Figure 1. This valve is splined on the shaft 133 as at 137' to permit the shaft to slide axially while the valve 137 remains on its seat, and a compression spring 138 is arranged between the valve 137 and a flange or collar 139 formed on the shaft 133. It will be apparent that the spring 138 urges the shaft 133 toward the right as viewed in Figures 1, 7, 8 and 10 while maintaining the valve 137 on its seat.

The shaft 133 is provided with means to be described for limiting its movement toward the right to the position shown in Figure 10. When the shaft is in such position, the head 134 closes a passage 140, leading between the passages 131 and 132, and also closes an atmospheric passage 141 leading into the passage 132. At the same time, the valve head 135 serves to close a passage 142, connected between the passages 130 and 132, and also closes an atmospheric passage 143 having its inner end leading into the passage 132. The head 135 is connected to the body portion of the shaft 133 by a reduced shank 144. As will become apparent, the shaft 133 is adapted to partake of predetermined movement toward the left as viewed in Figure 10 to connect the passages 140 and 141 through the space around the shank 136, while further movement of the shaft 133 to the left maintains connection between the passages 140 and 141 and also opens communication through the space around the shank 144, between the passages 142 and 143.

The shaft 133 is provided with a selector handle 145 arranged in a segmental housing 146 and extending through the top thereof. The upper face of the segmental housing is provided with a pair of parallel slots 147 and 148 connected by a transverse slot 149. As will become apparent, the handle 145 may be moved forwardly in the slot 147, that is, upwardly as viewed in Figure 7, to place the gear set in second speed and rearwardly in the same slot for third speed. Similarly, the handle 145 may be moved through the slot 149 and rearwardly in the slot 148 to place the gear set in first gear, the handle 145 being movable to the forward end of the slot 148 to place the gear set in reverse. A transverse slot 150 connects the slot 148 with a third slot 151 extending rearwardly from the transverse slot 150 and adapted to receive the handle 145 to place the gear set in fourth speed. The various positions of the handle 145 referred to are merely illustrations, and it will become apparent that the apparatus may be designed in accordance with the desires of a particular manufacturer. The handle 145 may engage the right hand edge of the slot 147 to prevent movement of the shaft 133 to the right of the position shown in Figure 10.

The operation of the apparatus is as follows:

It will become apparent that the gear set is in neutral whenever the selector handle 145 is in the position shown in Figure 7, or in any position in alignment with the transverse slots 149 and 150. Assuming that the vehicle is at a standstill and the operator is ready to proceed forwardly, he will depress the clutch pedal 112 (Figure 5), then move the selector handle 145 to the left as viewed in Figure 7 to a position in alignment with the slot 148, and then rearwardly in such slot. In order that the operation of the apparatus may be more clearly followed, it is pointed out that the top of Figure 7 represents the forward end of the vehicle, while the perspective showing in Figure 1 is looking toward the forward end of the vehicle.

The movement of the selector handle 145 to the left into alignment with the slot 148 moves the shaft 133, while the head 134 (Figure 10) moves to the left to uncover the ports 140 and 141, thus admitting air into the pipe 95. This action however, does not open the port 142 to the atmosphere, due to the length of the valve head 135. Thus air will be admitted into the diaphragm chamber 86 (Figure 2) and a differential pressure will be created on opposite sides of the diaphragm 90 to move the valve 60 downwardly into engagement with its lower valve seat 64.

It will be apparent that the valve chamber 56 communicates with the vacuum passage 74, leading to the intake manifold through pipe 76. Downward movement of the valve 60, therefore, connects the valve chamber 56 to the source of vacuum, and this chamber communicates with the crossover motor chamber 30 (Figure 6) through pipe 45. Atmospheric pressure will be present in the motor chambers 31, 36 and 42, and accordingly equalized pressure exists on opposite sides of the diaphragm 35, while differential pressure will act on the diaphragm 41 to move it from the dotted line position in Figure 6 to the solid line position.

This action takes place against the tension of the spring 48 and moves the shifting finger 17 from the notch 14 into the notch 15 to prepare the shift rod 12 for operation. When the diaphragm 41 reaches the position referred to, its movement is arrested by the stem 49, which is urged toward the right in Figure 6 by the spring 51. The differential pressure acting on the diaphragm 41 is insufficient to overcome the tension of both of the springs 48 and 51, and sliding movement of the shafts 18 and 46 will be arrested at the point indicated.

As previously stated, the action referred to prepares the shift rod 12 for actuation, and such action takes place upon rearward movement of the selector handle 145 in the slot 148. As previously stated, the operator will have depressed the clutch pedal 112 before moving the selector handle 145. Prior to such operation of the clutch pedal, the valve 106 will have occupied the position shown in Figure 5 in which case the pipe 103 will be connected to the atmosphere through the port 113. It will be apparent, therefore, that atmospheric pressure will be present in the diaphragm chambers 87 and 88 (Figure 2) and accordingly the valves 61 and 62 will be in engagement with their lower seats, the differential pressures on opposite sides of the diaphragms 91 and 92 moving these valves to lower positions.

However, upon depression of the clutch pedal prior to gear selection, the valve 106 (Figure 5) will move to the right from the position shown to close the port 113 and open communication between the pipe 103 and the vacuum pipe 114. Accordingly air will be exhausted from the diaphragm chambers 87 and 88 (Figure 2) through the ports 101 and 102, thus equalizing pressure on opposite sides of the diaphragms 91 and 92, such pressure being that of the intake manifold. Under such conditions, atmospheric pressure, acting against the lower faces of the valves 61 and 62 moves these valves upwardly into engagement with their upper seats. Thus the depression of the clutch pedal prepares the valves 61 and 62 for operation in accordance with movement of the control handle 145. As stated, under the conditions being considered, the handle 145 is moved to the left of the position shown in Figure 7 until it is in alignment with the slot 148 and since first gear is now to be selected, the handle 145 is moved rearwardly in the slot 148 to the low gear position. The latter movement rocks the shaft 133 in a counter-clockwise direction as viewed in Figure 1, thus opening the passage 128 (Figure 8) to the atmosphere and admitting air into the pipe 119. This pipe is in constant communication with the pipe 96 through the valve passage 117 (Figure 11) and accordingly atmospheric pressure will be admitted into the chamber 87. The rate of admission of air into this chamber of course will be greater than the rate of exhaustion of the air through the restricted passage 101, and differential pressure thus will be built up on opposite sides of the diaphragm 91 to move this diaphragm and its valve 61 downwardly. This valve accordingly moves from its upper seat 63 to its lower seat 64, thus connecting the valve chamber 57 to the source of vacuum through passage 74.

The valve chamber 57 communicates through the pipe 26 (Figures 1 and 3) with the lower or rear end of the cylinder 24, and accordingly such end of the cylinder will be connected to the source of vacuum. At the same time the forward end of the cylinder 24 will remain open to the atmosphere through pipe 25 and valve chamber 58, the valve 62 being in its upper position as shown in Figure 2. Thus the piston 23 will move rearwardly to rock the shaft 18 in a clockwise direction as viewed in Figure 1, and the shift rod 12 will be moved rearwardly into first gear position.

During the operation referred to the diaphragm chamber 88 will remain closed to the atmosphere since the selector valve passage 129 (Figure 8) will be closed by the valve 137, while the port 122 (Figure 11) will be closed to the atmosphere by the slide valve 123. However, when the first gear position is reached, the valve 123 will open the port 122, thus admitting air into the passage 118, pipe 97 and diaphragm chamber 88. The valve 62 thus will move to its lower valve seat 64, due to the differential pressure created on opposite sides of the diaphragm 92 by the admission of air into the chamber 88. The valve chamber 58 thus will be connected to the source of differential pressure, and since this chamber is connected to the upper end of the cylinder 24 through pipe 25 (Figures 1 and 2) air will be exhausted from the forward end of the cylinder 24 to "vacuum suspend" the piston 23 in its upper or forward position.

After the vehicle has been properly accelerated in first gear, the shift into second gear may be effected. The selection of second gear may be made prior to clutch disengagement, if desired, due to the functioning of the valve mechanism 104 (Figures 1 and 5). The exhaustion of air from the diaphragm chambers 87 and 88 is effected through the restricted passages 101 and 102, which communicate with the pipe 103 leading to the valve casing 105. Whenever the clutch is in engagement, the valve 106 will occupy the solid line position shown in Figure 5, and accordingly the pipe 103 will communicate with the atmosphere through the port 113, thus maintaining air pressure in the chambers 87 and 88 and preventing the controlling of the valves 61 and 62 by the selector mechanism. In this connection it will be noted that the rocking of the valve 137 by the handle 145 controls the admission of air into the chambers 87 and 88. However, when the clutch is engaged, both chambers 87 and 88 will be positively maintained in communication with the atmosphere through the passages 101 and 102 by the valve 106. Hence, under such conditions, operation of the valve 137 by the handle 145 cannot affect the positions of the valves 61 and 62, both valves remaining in their lower positions. Upon disengagement of the clutch, however, the valve head 108 moves toward the right as viewed in Figure 5, to close communication between the pipe 103 and the atmosphere, the head 107 moving to the right to establish communication between the pipes 103 and 114. As shown in Figure 1, the pipe 114 is connected to the pipe 76 leading to the intake manifold. Accordingly it will be apparent that a partial vacuum can exist in the chambers 87 and 88 only when the vehicle clutch is disengaged, and the valves 61 and 62 are subject to manual control only during clutch disengagement. During clutch engagement, the maintenance of the valves 61 and 62 in their lower position maintains the vacuum suspension of the piston 23 in any gear position. From the foregoing it will be apparent that the valve mechanism 104 renders the selector valve mechanism incapable of manual control unless and until the clutch is disengaged and accordingly preselection of gears may be made between any two gear positions which are respectively forward and rear positions of the selector handle 145.

Assuming that the shift is to be made into second gear the operator will move the selector handle 145 forwardly from the rear end of the slot 148, transversely to the right through slot 149, and then forwardly in the slot 147. The movement of the handle 145 through the slot 148 moves the shaft 133 axially to the position shown in Figure 10, under which conditions both of the passages 130 and 131 will be closed to the atmosphere. Thus the chambers 85 and 86 will be closed to the atmosphere, and air will be exhausted from these chambers through the valve stem passages 98. Since the valve 59 will have been in the position shown in Figure 2 when the vehicle was in first gear, this valve will be unaffected by the operation referred to. However, the valve 60 will have been in its lower position in first gear, and the closing of the pipe 95 to the atmosphere, together with the exhaustion of air from the chamber 86, will move the valve 60 into engagement with its upper seat 63, thus connecting the valve chamber 56 to the atmosphere.

The crossover into the first gear position will have been accomplished in the manner stated, by exhausting air from the chamber 30 to establish differential pressure on opposite sides of the diaphragm 41 to move this diaphragm to the solid line position shown in Figure 6. The return of the valve 60 to its upper position upon movement of the selector handle through the slot 149 will again connect the chamber 30 to the atmosphere through the pipe 45 and valve chamber 56, and accordingly atmospheric pressure will be present in all of the chambers of the crossover motor. The spring 48 is thus free to move the shaft 18 toward the right as viewed in Figure 6 to engage the shift arm 17 in the notch 14, thus preparing the shift rod 11 for operation.

Upon movement of the selector handle 145 forwardly in the slot 147, the shaft 133 will be rocked in a clockwise direction as viewed in Figure 1 to cover the previously opened passage 128 and open the passage 129 to the atmosphere. It will be recalled that when the parts assumed the low gear position, the port 122 (Figure 11) was opened to the atmosphere while the port 121 was closed to the atmosphere. Under such conditions, therefore, the pipe 120 will be opened to the atmosphere both through the port 122 and through the selector valve port 129 when the selector handle is placed in second gear position. At the same time, the pipe 119 will be closed to the atmosphere through the port 121 and also through the port 128.

The turning of the selector valve 137 therefore opens to the atmosphere the pipe 120 which is already opened to the atmosphere when the shift parts reach low gear position, and atmospheric pressure thus will be retained in the pipe 97 and diaphragm chamber 88, and thus the valve 62 will remain in its lower position connecting the valve chamber 58 to the source of vacuum. Thus vacuum will be retained in the upper end of the cylinder 24. Whereas the pipe 119 will have been opened to the atmosphere in the low gear position through the selector valve passage 128, this pipe will be closed to the atmosphere upon movement of the selector handle to the second gear position in the manner described. Accordingly the diaphragm chamber 87 will be closed to the atmosphere and air will be exhausted therefrom through the restricted passage 101, when the clutch is disengaged, which action connects the pipe 103 to the vacuum pipe 114. The diaphragm 91 will then move upwardly, and the valve 61 will move from its lower seat to its upper seat to connect the valve chamber 57 to the atmosphere.

The admission of atmospheric pressure into the lower end of the cylinder 24 obviously will effect movement of the piston 23 upwardly to rotate the shaft 18 in a counterclockwise direction as viewed in Figure 1, the shift rod 11 thus being moved forwardly to the second gear position.

When such position is reached, the slide valve 123 will uncover the port 121, thus admitting air into the passage 117, pipe 96 and diaphragm chamber 87, whereupon the diaphragm 91 will move downwardly. Accordingly the valve 61 will be transferred from its upper seat to its lower seat, when second gear position is reached, thus connecting the lower end of the cylinder 24 to the intake manifold to vacuum suspend the piston in second gear position.

It will be apparent of course that the transferring of the shift arm 17 from the notch 15 to the notch 14 when shifting from first to second gears can take place only after the shift rod 12 has been moved to neutral position to align the slots 14 and 15. It also will be apparent that in transferring the shift between any two shift rods, all of the rods will be in neutral position before the crossover operation can take place.

The shift from second gear into third gear takes place in a manner which will be obvious from the foregoing description. The selector handle 145 will be moved to the rear end of the slot 147, and accordingly the crossover motor will not be affected, since there will be no sliding of the valve heads 134 and 135 (Figure 10). The placing of the selector handle in the rear end of the slot 147 will control the main shift motor in the same manner as described in connection with the shift into first gear, the rotation of the valve 136 admitting air into the selector valve passage 128 and through pipe 119, slide valve passage 117 and pipe 96, to the diaphragm chamber 87 to drop the valve 61 to its lowermost position and thus connect the lower end of the cylinder 24 to the intake manifold. Thus it will be apparent that forward movement of the selector handle in either of the slots 147 or 148 will admit air into the lower end of the cylinder 24 and connect the upper end of this cylinder to the source of vacuum. Conversely, movement of the selector handle 145 to the rear end of either of the slots 147, 148 or 151 will admit air into the diaphragm chamber 87 to connect the lower end of the cylinder 24 to the source of vacuum while admitting atmospheric pressure into the upper end of the cylinder.

The foregoing operations generally coincide with the operations of the apparatus disclosed in the copending application of Edward D. Lasley Serial No. 97,451, filed August 22, 1936, referred to above. The present construction, however, provides novel means in the form of a unitary motor for effecting the transverse shift between more than two shift rods, thus rendering the device applicable to five speed transmissions, such as those now commonly used on trucks and buses and on some types of passenger vehicles. The shift between the shift rods 11 and 12 is set forth in the foregoing description, and it will be recalled that the shift to the notch 15 of the shift rod 12 is accomplished by connecting the crossover motor chamber 30 to the source of vacuum, the tension of the spring 51 arresting the movement of the shaft 18 in the position shown in Figure 6. In other words, while the differential pressure on opposite sides of the diaphragm 41 is sufficient to compress the spring 48 to shift to the first and reverse gear shift rod 12, such differential pressure is insufficient to compress both of the springs 48 and 51.

When it is desired to shift into fourth gear, the selector handle is moved through the transverse slots 149 and 150, and then rearwardly in the slot 151. Sliding movement is transmitted to the selector valve shaft 133 to move this shaft toward the left as viewed in Figures 8, 9 and 10. Under such conditions, the valve heads 134 and 135 will be moved one step further than the position previously described when selecting the shift rod 12 for operation. In the first step of the sliding movement of the shaft 133, the valve head 134 (Figure 10) opens the passage 140 to the atmosphere through the port 141. Due to the length of the valve head 135, the movement referred to does not move such valve head beyond the passage 142. The second step of the sliding movement of the shaft 133, however, moves the head 135 beyond the passage 142 to open communication between this passage and the port 143. The length of the shank 136 is such that the second step in the movement of the valve heads 134 and 135 will maintain communication between the passage 140 and port 141.

It will be apparent therefore that air will be admitted into both of the pipes 94 and 95, and accordingly into the diaphragm chambers 85 and 86, whereupon both of the valves 59 and 60 will be moved downwardly into engagement with their lower seats 64. Both of the valve chambers 55 and 56 thus will be closed to the atmosphere and opened to communication with the source of vacuum through the passage 74. Since the pipes 38 and 45 communicate respectively with the valve chambers 55 and 56 and lead respectively to the crossover motor chambers 36 and 30, it will be apparent that both of the latter chambers will be connected to the source of vacuum. With both of the chambers 31 and 42 vented to the atmosphere, differential pressure will be established on opposite sides of both of the diaphragms 35 and 41, and the total differential pressure thus established will be sufficient to overcome the tension of both of the springs 48 and 51. Thus the shafts 46 and 18 will be moved one step to the left of the position shown in Figure 6, thus bringing the shift arm 17 into engagement with the notch 16 of the fourth speed shift rod 13.

Selection of the shift rod 13 having been made in the manner stated, the rearward movement of the selector handle 145 in the slot 151 will open the selector valve passage 128 to the atmosphere, thus admitting air into the diaphragm chamber 87 in the manner previously described, whereupon the valve 61 will be moved to its lower seat to connect the lower end of the cylinder 24 to the source of vacuum. The piston 23 will then move downwardly to rock the shaft 18 and effect the shift into fourth speed.

From the foregoing it will be apparent that the present construction provides a simple and effective mechanism for transferring a transmission shifting action between more than two shift rods, thus rendering the shifting apparatus particularly adapted for use with so-called five-speed transmissions. Such selective crossover operations are effected by the use of a unitary motor 27, the structure of which is quite simple, as will be apparent. This motor is effectively controlled by means of the valve mechanism described. Air is admitted into the diaphragm chamber 86 to select the shift rod 12 for operation, while air is admitted into both of the diaphragm chambers 85 and 86 to select the shift rod 13 for operation. By returning the valve heads 134 and 135 to the position shown in Figure 10, both of the diaphragm chambers 85 and 86 will be disconnected from the atmosphere, thus establishing equalized vacuum on opposite sides of the diapragms 89 and 90 due to the leakage ports 99 of the stems of the valves 59 and 60.

As previously stated each of the main valves will engage its upper seat when the pressures in the corresponding upper and lower diaphragm chambers are equal. In the copending application of Edward D. Lasley, referred to above, two forms of the valve mechanism are illustrated. In one form of mechanism, a spring is employed for urging each of the main valves upwardly. In the other form of mechanism it is disclosed that these springs are not essential in order that the valves may be biased upwardly. The biasing springs may be omitted for the reasons that the valve stems occupy part of the effective areas of the lower faces of the diaphragms, while atmospheric pressure is always present against the bottom faces of the valves with reduced pressure present above the valves. The total differential pressure affecting the main valves, therefore, biases these valves to their upper positions, and either valve is promptly moved to its lower position by the admission of air into the corresponding upper diaphragm chamber.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a motor vehicle having a transmission provided with a plurality of parallel longitudinally shiftable members, comprising an operator selectively operable for shifting either of said members, a motor including a movable element operable for selecting said members for actuation, means biasing said element in one direction to select one member for actuation, control means for effecting actuation of said motor to move said element in the opposite direction, means normally limiting the movement of said element in said last named direction to a position selecting a second member for actuation, means for rendering said limiting means inoperative to release said element for movement by said motor to a third position selecting a third member for actuation, and means for operating said operator to actuate the selected member.

2. In a transmission having a plurality of members shiftable for changing the gear ratio of the transmission, a motor for selecting said members for actuation, said motor comprising an atmospheric chamber, a variable pressure chamber and a pressure movable member therebetween movable to a plurality of positions for selecting said shiftable members, means biasing said movable member in one direction to a position selecting one shiftable member for actuation, means for varying the pressure in said pressure chamber to effect movement of said movable member in the opposite direction, means normally limiting movement of said movable member in said last named direction to a second position selecting a second shiftable member for actuation, and means for rendering said limiting means inoperative to release said movable member for movement by said motor to another position selecting a third shiftable member for actuation.

3. In a transmission having a plurality of members shiftable for changing the gear ratio of the transmission, a motor for selecting said members for actuation, said motor comprising an atmospheric chamber, a variable pressure chamber and a pressure movable member therebetween movable to a plurality of positions for selecting said shiftable members, means biasing said movable member in one direction to a position selecting one shiftable member for actuation, means for varying the pressure in said pressure chamber to effect movement of said movable member in the opposite direction, a spring normally operative for limiting movement of said movable member in said last named direction to a second position selecting a second member for actuation, and means operable against the tension of said spring to release said movable member to movement by said motor for another position selecting a third shiftable member for actuation.

4. In a transmission having a plurality of members shiftable for changing the gear ratio of the transmission, a motor structure for selecting said members for actuation, said motor structure comprising a pair of atmospheric chambers and a pair of variable pressure chambers, a pair of pressure movable members each arranged between one atmospheric chamber and one pressure chamber, means biasing one movable member to a position selecting one shiftable member for actuation, means for varying the pressure in the corresponding pressure chamber to move said last named movable member to a position selecting a second shiftable member for actuation, the other pressure movable member having limiting means tending to prevent movement of the first named movable member beyond its last named position, and means for changing the pressure in the other variable pressure chamber for overcoming said limiting means to release the first named pressure movable member for movement to another position selecting a third shiftable member for actuation.

5. In a transmission having a plurality of members shiftable for changing the gear ratio of a transmission, a motor structure for selecting said members for actuation, said motor structure comprising a casing having a wall intermediate its ends to form a pair of motor sections each having an atmospheric chamber, a variable pressure chamber and a pressure movable member therebetween, means biasing one movable member in one direction to select one shiftable member for actuation, means for varying the pressure in the corresponding pressure chamber to move said last named movable member in the opposite direction, a stop member carried by the other movable member and projecting through said wall, means biasing said second named movable member in the first named direction to limit the movement of the first named movable member in the second named direction to a position selecting a second shiftable member for actuation, and means for rendering said last named biasing means inoperative, to move said stop member and thereby release said first named movable member for movement in said second named direction to a position selecting a third shiftable member for actuation.

6. A gear shifting mechanism for a motor vehicle having a transmission provided with a plurality of longitudinally shiftable members, comprising a selecting motor, an actuating element connected to the motor and selectively engageable with said members, means within said motor for normally moving said actuating element in one direction into engagement with one of said members, means for energizing said motor to move said actuating element in the opposite direction into engagement with another of said members, means tending to resist movement of said actuating member in said last named direction from its position engaging said last mentioned member, means for rendering said last named means inoperative whereby said motor will move said actuating element in the last named direction into engagement with another of said members, and means for actuating the selected member.

7. A gear shifting mechanism for a motor vehicle having a transmission provided with a plurality of parallel longitudinally shiftable members, comprising an operator selectively operable for shifting either of said members, a motor including a movable element operable for selecting said members for actuation, means biasing said element in one direction to select one member for actuation, control means for effecting actuation of said motor to move said element in the opposite direction, means normally limiting the movement of said element in said last named direction to a position selecting a second member for actuation, fluid pressure operated means for rendering said limiting means inoperative to release said element for movement by said motor to a third position selecting a third member for actuation, and means for operating said operator to actuate the selected member.

8. In a transmission having a plurality of members shiftable for changing the gear ratio of the transmission, a motor for selecting said members for actuation, said motor comprising an atmospheric chamber, a variable pressure chamber and a pressure movable member therebetween movable to a plurality of positions for selecting said shiftable members, means biasing said movable member in one direction to a position selecting one shifting member for actuation, means for varying the pressure in said pressure chamber to effect movement of said movable member in the opposite direction, means normally limiting movement of said movable member in said last named direction to a second position selecting a second shiftable member for actuation, and fluid pressure operated means for rendering said limiting means inoperative to release said movable member for movement by said motor to another position selecting a third shiftable member for actuation.

9. In a transmission having a plurality of members shiftable for changing the gear ratio of the transmission, a motor for selecting said members for actuation, said motor comprising an atmospheric chamber, a variable pressure chamber and a pressure movable member therebetween movable to a plurality of positions for selecting said shiftable members, means biasing said movable member in one direction to a position selecting one shiftable member for actuation, means for varying the pressure in said pressure chamber to effect movement of said movable member in the opposite direction, a spring normally operative for limiting movement of said movable member in said last named direction to a second position selecting a second member for actuation, and fluid pressure operated means for overcoming the tension of said spring to release said movable member for movement by said motor to another position selecting a third shiftable member for actuation.

10. A gear shifting mechanism for a motor vehicle having a transmission provided with a plurality of longitudinally shiftable members, comprising a selecting motor having a pressure movable member, an axially movable stem connected thereto and a shiftable member engaging and actuating element, means biasing said element in one direction to select one shiftable member for actuation, control means for effecting actuation of said motor to move said element in the opposite direction, a stop member axially movable with respect to said motor, means normally holding said stop member in a position to limit movement of said pressure movable member to a position with said element engaging a second shiftable member, and means for rendering said holding means ineffective for holding said stop member in its normal position whereby energization of said motor will move said element in said second named direction into engagement with a third shiftable member.

11. A gear shifting mechanism for a motor vehicle having a transmission provided with a plurality of longitudinally shiftable members, comprising a selecting motor having a pressure movable member, an axially movable stem connected thereto and a shiftable member engaging and actuating element, means biasing said element in one direction to select one shiftable member for actuation, control means for effecting actuation of said motor to move said element in the opposite direction, a stop member axially movable with respect to said motor, means normally holding said stop member in a position to limit movement of said pressure movable member to a position with said element engaging a second shiftable member, and means for rendering said holding means ineffective for holding said stop member in its normal position whereby energization of said motor will move said element in said second named direction into engagement with a third shifable member, said stem having a swivel connection between said element and said pressure movable member whereby said element is rockable to effect longitudinal movement of the shiftable member with which it is engaged.

12. A gear shifting mechanism for a motor vehicle having a transmission provided with a plurality of longitudinally shiftable members, comprising selecting motor having a pressure movable member, an axially movable stem connected thereto and a shiftable member engaging and actuating element, means biasing said element in one direction to select one shiftable member for actuation, control means for effecting actuation of said motor to move said element in the pppo-site direction, a stop member axially movable with respect to said motor, means normally holding said stop member in a position to limit movement of said pressure movable member to a position with said element engaging a second shiftable member, and a fluid pressure operated device operable for overcoming said holding means to free said stop member from its normal position whereby energization of said motor to move said pressure responsive member in the second named direction will effect movement of said element into engagement with a third shiftable member.

13. A gear shifting mechanism for a motor vehicle having a transmission provided with a plurality of longitudinally shiftable members, comprising a selecting motor having a pressure movable member, an axially movable stem connected thereto and a shiftable member engaging and actuating element, means biasing said element in one direction to select one shiftable member for actuation, control means for effecting actuation of said motor to move said element in the opposite direction, a stop member axially movable with respect to said motor, means normally holding said stop member in a position to limit movement of said pressure movable member to a position with said element engaging a second shiftable member, and a fluid pressure operated device operable for overcoming said holding means to free said stop member from its normal position whereby energization of said motor to move said pressure responsive member in the second named direction will effect movement of said element into engagement with a third shiftable member, said stem having a swivel connection between said element and said pressure movable member whereby said element is rockable to effect longitudinal movement of the shiftable member with which it is engaged.

VIRGIL F. SIMONICK.